Patented Apr. 17, 1945

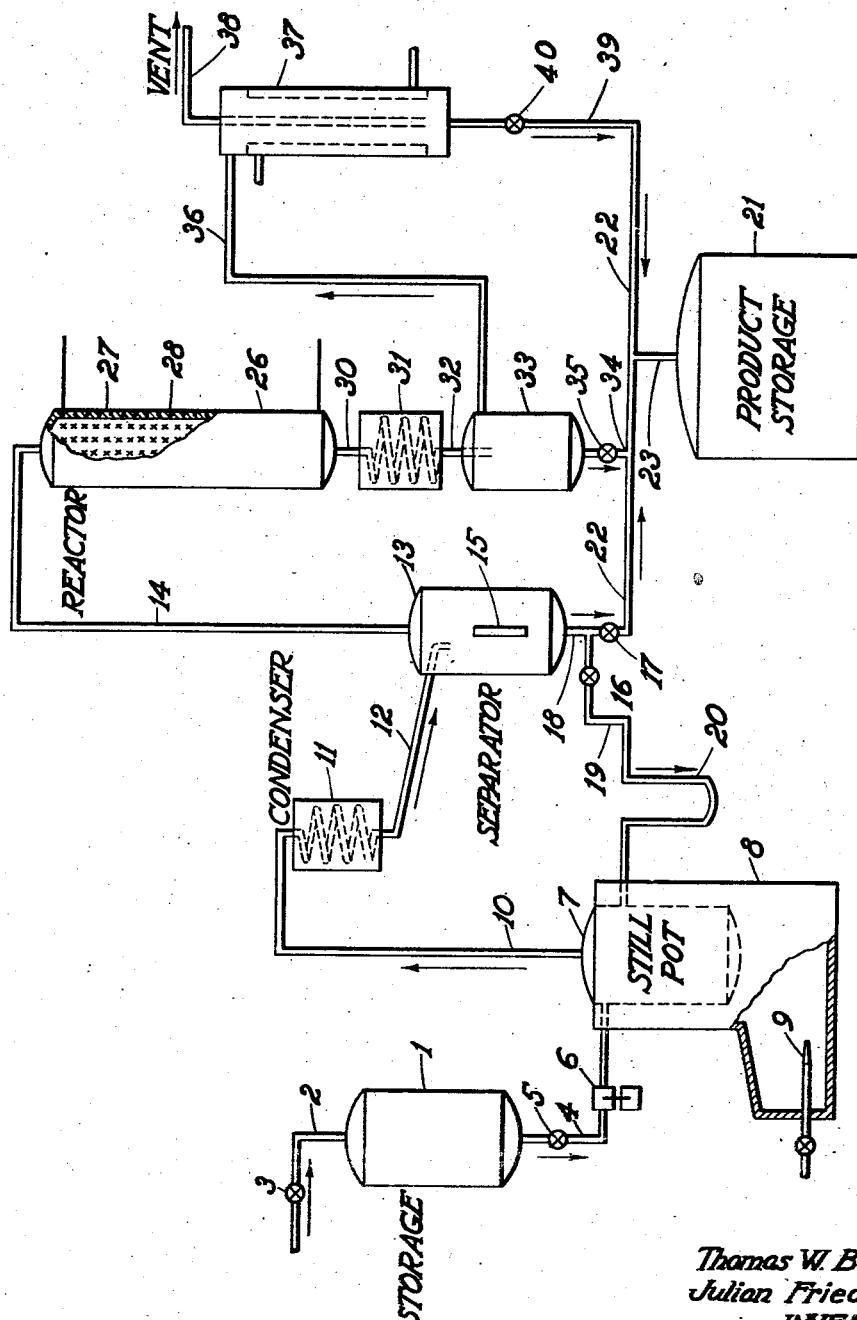

2,373,803

UNITED STATES PATENT OFFICE 2,373,803

CATALYST RECOVERY PROCESS

Thomas W. Baker and Julian Friedman, Dallas, Tex., assignors, by mesne assignments, to Socony-Vacuum Oil Company, Incorporated, New York, N. Y., a corporation of New York Application March 13, 1944, Serial No. 526,230

14 Claims. (Cl. 23—96)

This invention relates to the recovery of aluminum bromide from light tars which are formed in low temperature hydrocarbon conversion processes. These tars are presumably complex compounds formed by the interaction of aluminum bromide and the hydrocarbons, and settle out as an immiscible layer.

The use of aluminum bromide to catalyze a low temperature hydrocarbon isomerization process has been disclosed in U. S. Patent 2,288,477 to Charles W. Montgomery. The use of aluminum bromide to catalyze other low temperature hydrocarbon conversion reactions and condensation reactions has been disclosed in copending application Serial No. 448,886, filed June 29, 1942, by Will Swerdloff and Manual H. Gorin. Aluminum bromide is similar to aluminum chloride in its catalytic activity for these low temperature hydrocarbon conversion processes and offers the advantage over aluminum chloride in that it is soluble in liquid hydrocarbons. Because of this solubility of aluminum bromide in liquid hydrocarbons more efficient contacting between the catalyst and the hydrocarbon reactant is obtainable, than is possible with aluminum chloride. Also, since vigorous agitation is unnecessary by the use of aluminum bromide, it is economical to provide longer reaction time, thus making unnecessary the use of promoters such as halogen acids to increase the velocity of the hydrocarbon conversion reaction. For these and many other reasons aluminum bromide is very useful as a catalyst, and is superior to aluminum chloride in many respects.

Aluminum bromide is, however, considerably more expensive than aluminum chloride and in order to be able to utilize its advantages it should be efficiently recoverable for reuse in any process in which it is used as the catalytic agent. Therefore, any process for the recovery of aluminum bromide must not only be economical, but should also result in the recovery of substantially all of the aluminum bromide used in the hydrocarbon conversion process. This recovery of the relatively expensive aluminum bromide should of necessity be much more complete than processes heretofore in use for the recovery of aluminum chloride.

Without intending to limit ourselves to any theoretical considerations, it is our belief that aluminum bromide when used as the catalytic reagent in hydrocarbon conversion processes apparently reacts with unsaturated hydrocarbons, either present in the reaction mixture or formed in the presence of the catalyst through cracking reactions to form complex organic-aluminum halide compounds. These compounds are substantially immiscible with the hydrocarbons and therefore, are much less desirable as catalytic agents. These complex organic-aluminum bromide compounds settle out from the liquid hydrocarbon reaction mixture as an immiscible layer, and are associated with a certain amount of additional saturated hydrocarbons soluble in the catalyst complex. The aluminum bromide tar will usually contain from 60 to 80 percent by weight of aluminum bromide. While this organic-aluminum bromide complex apparently still has considerable catalytic activity, the advantage of solubility in the hydrocarbons is lost and hence the catalyst complex should be withdrawn and the aluminum bromide recovered to render it suitable for reuse.

In a copending application of Irving H. Welinsky and Manuel H. Gorin, Serial No. 459,542, filed September 24, 1942, a method was proposed for the recovery of aluminum bromide from light tarry complexes.

By method of this latter application the aluminum bromide was recovered by subjecting the tarry complex to destructive distillation. This was done by distilling the tar under conditions of total reflux of hydrocarbons boiling above about 100° C., until the tar was reformed by the action of the heat in the presence of the catalyst to light fixed gases, aluminum bromide and high boiling hydrocarbons or coke. The light fixed gases were first distilled off and then the aluminum bromide was distilled off and recovered, while the heavy material not volatile at the distillation temperatures employed were retained in the still pot.

The present invention is based on experience gained in the use of this destructive distillation process for the recovery of aluminum bromide from tarry complexes and represents certain improvements on this process, as will be brought out hereinbelow.

The most important of these improvements is concerned with the method of heating the tar. Heretofore, when the vessel containing the relatively cool tar was heated, the portions of the tar near the walls of the vessel heated up rather quickly, while the inner portions of the tar, remote from the walls, remained relatively cool due to the slowness of the heat transfer through the body of the tar. Overheating of the portions of the tar adjacent the vessel walls frequently occurred resulting in the formation of a coky residue which adhered to the walls. The formation of this coky layer was disadvantageous in that it lowered the heat conductivity through the walls of the vessel, and made frequent cleaning operations necessary. Also, gases produced by distillation from and cracking of the overheated portions of the tar, travelled through the body of the tar and caused bubbling and frothing as they broke the surface. Due to this bubbling and frothing some of the tar was carried over into the fractionating column, causing a decrease in the efficiency of the column and consequently a decreased recovery of the halide value of the tar. Also, in many instances, a clogging of the column was encountered, due to the accumulation of tar therein. By employing a slow application of heat to the heating vessel, overheating of the tar was greatly minimized. However, the long period of time consumed in the heating operation tended to lessen the value of the process from an economical standpoint.

An object of the present invention is to provide an improved method of heating the tar whereby bubbling and frothing of the tar is avoided. Another object is to reduce the length of the heating period and hence the time necessary for carrying out the recovery process. Still another object is to effect a more complete recovery of the aluminum bromide in substantially pure form. Other objects will be apparent from the following description of the invention.

Our invention essentially comprises a semicontinuous process for the recovery of aluminum bromide from tarry masses whereby the tar is fed to the heating vessel at a substantially constant optimum rate while the temperature of the vessel is maintained within a range suitable for promoting a rapid evolution of fixed gases from the tar without substantial cracking of the tar. Thus, dissolved gases and low boiling free hydrocarbons are rapidly removed from the tar while the tar is being quickly heated to a temperature sufficiently high to initiate the desired reforming reactions in the tar. In this way the bubbling and frothing of the tarry mass heretofore encountered is practically eliminated. When all of the tar has been admitted to the heating vessel, the heating temperature is raised to intensify the cracking of the tar so that the aluminum bromide-hydrocarbon complexes present in the tar are broken down to form free aluminum bromide which is then distilled off and recovered. Additional light hydrocarbons also produced by the cracking reactions are readily separated from the vaporous stream issuing from the heating vessel by cooling the stream to condense out the aluminum bromide. The recovery of the aluminum bromide content of the tar is made substantially complete by a further intensification of the heating temperature so that heavy hydrocarbons produced in the reforming reactions are eventually broken down to form fixed gases, such as hydrogen, and coke. The process also provides for the recovery of the halide value of any alkyl halides or hydrogen bromide formed in the distillation process.

The attached drawing is a schematic illustration of an apparatus suitable for practicing the improved process of our invention. Referring to the drawing, the light tar settling out as an immiscible layer from the low temperature hydrocarbon conversion reactor (not shown) is drawn off and sent to storage container 1 by way of line 2 provided with control valve 3. From the storage container, the tar is withdrawn in line 4, provided with a suitable control valve 5 and a pump 6 and sent to still pot 7, the temperature of which has been previously brought up to from about 500° F. to about 625° F. The rate of feeding of the tar to the still pot is preferably controlled between about 100 and about 200 pounds per hour per cubic foot of free space in the still pot. Since the density of the tar is generally in the neighborhood of 125 pounds per cubic foot, this means that between about 1.33 and about 2.66 percent of the free space of the reactor is filled per minute. Under these conditions a rapid evolution of dissolved gases from the tar, as it enters the pot, is effected. Some cracking of the tar during the feeding period takes place, however, the aluminum bromide-hydrocarbon complexes in the tar are substantially unaffected under the temperature conditions indicated. The temperature of the still pot is regulated by means of the furnace 8, provided with a blast burner 9.

When the feeding of the tar to the still pot has been completed the temperature of the pot is increased to from about 650° F. to about 850° F. to bring about an extensive cracking of the aluminum bromide-hydrocarbon complexes in the tar. Thus, at this temperature the tar is cracked to form light fixed gases and heavy hydrocarbons, as well as free aluminum bromide as the end products. The cracking also produces small quantities of alkyl halides and hydrogen bromide.

All of the gases and vapors formed during the feeding period as well as in the subsequent intensified cracking of the tar, are continuously withdrawn from the still pot in line 10 and passed to condenser 11. The condenser is controlled at a temperature within the range of from about 250° F. to 350° F. by means of a thermally regulated circulating oil bath (not shown) in order to condense aluminum bromide from the vaporous stream. Some of the heavier compounds produced in the initial cracking of the tarry complexes are not volatile under the temperature conditions obtaining in the still pot. However, some intermediary boiling hydrocarbons and hydrocarbon-aluminum bromide complexes formed during the early stages of the cracking operation are volatile and are carried over to the condenser where they are condensed concomitantly with the aluminum bromide.

The condensed material is withdrawn from the condenser by way of line 12, from whence it is discharged into separator 13. Here the condensate is collected, while the remaining vapors are passed off overhead through line 14 and directed to other units of the process to receive further treatment for the recovery of their aluminum bromide or halide value, as will be described later.

In order to free the aluminum bromide collecting in the separator from the concomitantly condensed hydrocarbon and tar material, the condensate is recycled to the still pot 7 in order to subject it to further cracking. The recycling is continued only until substantially pure aluminum bromide is being collected in the separator as will be evident from the white appearance of the condensate. A suitable window 15 is provided in the separator so that the material collecting therein may be conveniently observed.

The recycling operation is accomplished as follows. Valve 16, which is normally in a closed position is opened, valve 17 being kept closed, and the molten aluminum bromide is withdrawn from the separator and returned to the still pot by way of lines 18 and 19. Line 19 is provided with a suitable trap 20 to prevent leakage of vapors from the still pot to the separator through this line.

The recycling operation is stopped by closing the valve 16. The temperature of the still pot is then gradually raised to about 1400° F. and maintained at this level until the distillation is completed in order to crack the last traces of hydrocarbon complexes to fixed gases and coke, thus assuring a substantially complete recovery of the catalyst salt. When distillation is complete, the valve 17 is opened and the product is withdrawn from the separator and sent to storage tank 21 by way of lines 18, 22 and 23.

The vapors freed from the condensed material in the separator 13 and withdrawn overhead through line 14 are conducted to the top of the reaction tower 26. The tower 26 is packed with pieces of metallic aluminum 27 of suitable size and shape to provide a large surface area for contact with the incoming vapors. The tower is maintained at a temperature in the neighborhood of from 950° F. to 1150° F. by means of electric heaters 28 embedded in the tower walls. As the vaporous stream passes downwardly through the tower, any hydrogen bromide present therein will be converted to aluminum bromide by reaction with the metallic aluminum. Also, any alkyl halides present will be subjected to thermal cracking and will react with the aluminum metal to form additional aluminum bromide. The reformed vaporous stream leaves the reaction tower by way of line 30, which sends it to condenser 31. Condenser 31, like condenser 11, is maintained at a temperature within the range of from about 250° F. to about 350° F. in order to condense aluminum bromide vapors which were either formed in the contact tower or carried over from the separator 13. The partially condensed mixture is withdrawn from the condenser in line 32, from whence it is discharged into separator 33. From separator 33 molten aluminum bromide, in a highly purified condition, is withdrawn after distillation is completed, through line 34, provided with valve 35, and sent to storage tank 21 by way of lines 34, 22 and 23.

The overhead vapors from separator 33 are passed off in line 36, which carries them to a water cooled sublimation chamber 37. Here traces of aluminum bromide vapor which have been carried over in admixture with the vapors in the stream issuing from the separator 33 are condensed on the walls of the chamber. Residual gases, such as light hydrocarbons and hydrogen, are vented from the chamber 37 through line 38. Aluminum bromide on the chamber walls is readily recovered after completion of the process run, by applying sufficient heat to the outside of the chamber walls to melt it. The molten salt is then withdrawn from the chamber by way of line 39, provided with the valve 40, and sent to product storage tank 21 by way of lines 39, 22 and 23. Residual aluminum bromide vapors remaining in the still pot at the end of the run may be recovered by flushing these vapors with a hot inert gas, such as methane, or some of the fixed gases from the process itself.

Suitable heating means are provided around the melt conducting lines of the system as well as the separators 13 and 33, in order to prevent a possible clogging of the system due to solidification of the molten salt therein. Also, it is preferable that the storage tank 21, as well as the separators 13 and 33, be lined with suitable material, such as glass, to avoid the corrosive action of the catalyst salt.

In feeding of the tar to the still pot we have indicated a preferred rate of from about 100 to about 200 pounds per hour per cubic foot of volume of the pot. Employment of slower rates at the heating temperature indicated would be inefficient and make the feeding period unnecessarily long. Faster feeding rates, on the other hand, would not allow for complete removal of the dissolved gases and bubbling and frothing of the tar would be encountered when the heating temperature was increased after the feeding was completed.

A temperature of from 500° F. to 625° F. is preferably employed in the still pot during the feeding period, because temperatures below 500° F. do not provide sufficiently rapid distillation of light gases from the tar, although use of lower feeding rates than we have indicated would, of course, allow use of somewhat lower heating temperatures. However, the feeding operation is most efficient when the tar is admitted to the pot at the fastest rate consistent with rapid, complete removal of dissolved fixed gases without substantial cracking of the tar. This necessitates the employment of the highest temperatures which will not cause extensive cracking of the tar, as well as the use of the highest feed rates which will allow complete removal of the fixed gases from the tar. On the other hand, if the still pot is maintained above 625° F. during the feeding period, a flashing off of unreacted portions of the tar from the pot takes place. This flashing off of the tar may cause a clogging of the system and invariably results in a decreased percentage of catalyst recovery.

We have indicated a preferred temperature range of from 650° F. to 850° F. for the cracking of the tarry complexes because in this range violent cracking of the tar is avoided and the reforming reactions take place at a rate which is favorable for the recovery of the catalyst from the gaseous stream evolving from the heating vessel. Thus, employment of higher temperatures tend to flood the system with gases formed by very rapid cracking of the tar, so that efficiency of product recovery is decreased. The final heating to about 1400° F. after the main portion of the tar has been cracked, serves to break up any larger, more stable aluminum bromide-hydrocarbon complexes and usually results in an increased recovery of catalyst of from 10 to 15 percent. Although temperatures as high as 1600° F. have been employed, generally temperatures above 1400° F. give only an insignificant increase in the amount of catalyst recovered.

Use of temperatures in the neighborhood of 950° F. to 1150° F. in the aluminum tower serves to still further increase the catalyst recovery since temperatures of this order are capable of breaking down alkyl halides which are produced in the initial cracking and which are not condensible in condenser 13.

Ordinarily, the still pot will be constructed of iron or steel, and it is therefore recommended that sufficient metallic aluminum be added to the pot, prior to the admission of the tar, to prevent the formation of iron bromides therein. For this purpose the use of aluminum shavings, to give a large surface to volume ratio, is desirable. In fact, by adding sufficient aluminum to the still pot it is possible that all of the bromine, hydrogen and alkyl bromides formed may be reacted to form aluminum bromide. However, we prefer to pass the gases evolved from the still pot through a heated column packed with aluminum, as we have described hereinabove. This is because a much larger amount of aluminum surface is required in the pot, to obtain a complete reaction of these gases, than in the column. Also, a large amount of unreacted aluminum would have to be recovered from the pot residue after each run.

In order to illustrate the results obtainable by our improved method for recovering aluminum bromide catalyst from tarry complexes, the following example is given:

Example

The tarry residue settling out of the liquid phase alkylation reaction which was catalyzed by aluminum bromide, was drawn off for recovery of the catalyst therefrom. The tar was analyzed and showed a bromine content of 69.6 weight percent, or an aluminum bromide content of 77.5 weight percent. 2788 grams of this tar were fed to a still pot, enclosed in an electric furnace which was maintained at an average temperature of 530° F. during the feeding period in order to drive off the light fixed gases from the tar. All of the tar was charged to the still pot in a period of 60 minutes. This corresponds to a feed rate of 122 pounds per hour per cubic foot of internal reactor volume for the reactor used. The temperature of the still pot was then increased slowly for 49 minutes. At the end of the run the still pot had attained a temperature of 1590° F. which temperature was maintained for 7 minutes before terminating the run. The main portion of the aluminum bromide was distilled over within the temperature range of from 700° F. to 800° F.

All of the vapors and gases formed in the still pot during the feeding period and that produced by the cracking reactions at the higher temperatures, were passed through a condenser which was controlled at an average temperature of 304° F. Here, free aluminum bromide together with some intermediary boiling bromine compounds were condensed from the vaporous stream. From the condenser the mixture was passed to an aluminum bromide separator where molten aluminum bromide, contaminated with concomitantly condensed hydrocarbons was collected. The initial portions of the aluminum bromide which collected in the separator were withdrawn and recycled to the still pot. This recycling operation was continued for 5 minutes, at which time clear white product was being obtained.

The overhead vapors from the separator were passed to an aluminum packed tower maintained at an average temperature of 1050° F. The exit vapors were then condensed and passed to a second separator where additional aluminum bromide was collected. The overhead vapors from this separator were then sent to an aluminum bromide sublimation chamber for recovery of the last traces of catalyst salt.

The amount of aluminum bromide collected in the first separator was 1876 grams or 87.0 percent of the total content of the tar treated. 171.6 grams or 7.9 percent were collected in the second separator. An additional 40.4 grams, or 1.8 percent of the catalyst was deposited in the sublimation chamber. Thus, there was a total of 96.8 percent of catalyst recovered in a practically chemically pure form.

Separate analyses of the products collected in the two separators and in the sublimation chamber indicated that the catalyst in the first separator was the least pure, having an aluminum bromide content of 98.4 percent. On the basis of this figure alone, a total recovery of 95.3 percent of pure aluminum bromide was obtained.

An additional 1.6 percent of aluminum bromide was determined to be present in the coke-like residue remaining in the still pot. It can be presumed that most of the remaining 3.1 percent of the catalyst was held up in the condensers and contact tower.

These results indicate that in large scale operation, after the equipment had become saturated with aluminum bromide and other bromine compounds, a still higher recovery of catalyst from the tar would be attained.

Having fully disclosed our invention, and having described the advantages thereof, what we desire to be secured by Letters Patent is:

1. A process of recovering aluminum bromide from tarry masses formed in hydrocarbon conversion processes which employ aluminum bromide as a catalystic agent which comprises the steps of (1) introducing the tarry mass into a heating zone at a substantially constant rate, while maintaining the temperature of said zone at a sufficiently high level to cause a rapid evolution of gases from said tarry mass without substantial cracking of the mass, (2) increasing the intensity of heating in said zone, after the introduction of said tar thereto has been completed so as to crack the aluminum bromide-hydrocarbon complexes present in the tarry mass to form free aluminum bromide, and (3) recovering the aluminum bromide.

2. A process of recovering aluminum bromide from tarry masses formed in hydrocarbon conversion processes which employ aluminum bromide as a catalytic agent which comprises the steps of (1) introducing the tarry mass into a heating zone at a substantially constant rate, while maintaining the temperature of said zone at a sufficiently high level to cause a rapid evolution of gases from said tarry mass without substantial cracking of the mass, (2) increasing the intensity of heating in said zone, after the introduction of said tar thereto has been completed, so as to cause cracking of the aluminum bromide-hydrocarbon complexes present in the tarry mass, (3) passing the vapors produced in said heating zone to a cooling zone to condense aluminum bromide therefrom, (4) passing the remaining vapors from step 3 to a reaction zone wherein they are contacted with metallic aluminum at an elevated temperature to form additional aluminum bromide, (5) cooling the reformed vapors from step 4 to condense substantially pure aluminum bromide therefrom, and (6) recovering the aluminum bromide condensed in steps 3 and 5.

3. A process of recovering aluminum bromide from tarry masses formed in hydrocarbon conversion processes which employ aluminum bromide as a catalytic agent which comprises the steps of (1) introducing the tarry mass into a heating zone at a rate such that the volume of tarry mass introduced thereto per minute is between about 1.33 and about 2.66 percent of the total volume of said zone, while maintaining the temperature of said zone at a level sufficiently high to cause a rapid evolution of gases from the tarry mass as it enters said zone without inducing substantial cracking of said mass, (2) increasing the intensity of heating in said zone, after the introduction of said tarry mass thereto has been completed, so as to cause extensive cracking of the aluminum bromide-hydrocarbon complexes present in the tarry mass, to form free aluminum bromide, and (3) recovering the aluminum bromide.

4. A process of recovering aluminum bromide from tarry masses formed in hydrocarbon conversion processes which employ aluminum bromide as a catalytic agent which comprises the steps of (1) introducing the tarry mass into a heating zone at a rate of from about 100 to about 200 pounds per hour per cubic foot of free volume of said zone while maintaining the temperature of said zone within the range of from about 500°

F. to about 625° F., (2) increasing the intensity of heating in said zone, after the introduction of said tarry mass thereto has been completed, so as to cause extensive cracking of the aluminum bromide-hydrocarbon complexes present in said mass, to form free aluminum bromide, and (3) recovering the aluminum bromide.

5. A process of recovering aluminum bromide from tarry masses formed in hydrocarbon conversion processes which employ aluminum bromide as a catalytic agent which comprises the steps of (1) maintaining a heating zone at a temperature of from about 500° F. to about 625° F. while feeding the tarry mass into said zone at a rate such that the volume of said mass being fed thereto per minute is equal to from about 1.33 to about 2.66 percent of the total volume thereof, (2) increasing the temperature of said zone to from about 650° F. to about 1600° F., after the feeding period has been terminated, to substantially completely crack the aluminum bromide-hydrocarbon complexes present in said mass, and (3) recovering the aluminum bromide formed.

6. A process of recovering aluminum bromide from tarry masses formed in hydrocarbon conversion processes which employ aluminum bromide as a catalytic agent which comprises the steps of (1) maintaining a heating zone at a temperature of from about 500° F. to about 625° F. while feeding the tarry mass into said zone at a rate such that the volume of said mass being fed thereto per minute is equal to from about 1.33 to about 2.66 percent of the total volume thereof, (2) increasing the temperature of said zone to from about 650° F. to about 1600° F., after the feeding period has been terminated, to substantially completely crack said mass, (3) passing the vapors produced in said heating zone to a cooling zone to condense aluminum bromide therefrom, (4) passing the remaining vapors from step 3 to a reaction zone wherein they are contacted with metallic aluminum at an elevated temperature to form additional aluminum bromide, (5) passing the vapors from step 4 to a cooling zone to condense substantially pure aluminum bromide therefrom, and (6) recovering the aluminum bromide condensed in steps 3 and 5.

7. A process of recovering aluminum bromide from tarry masses formed in hydrocarbon conversion processes which employ aluminum bromide as a catalytic agent which comprises the steps of (1) maintaining a heating zone at a temperature of from about 500° F. to about 625° F. while feeding the tarry mass into said zone at a rate such that the volume of said mass being fed thereto per minute is equal to from about 1.33 to about 2.66 percent of the total volume thereof, (2) increasing the temperature of said zone to from about 650° F. to about 1600° F., after the feeding period has been terminated, to substantially completely crack the aluminum bromide-hydrocarbon complexes present in said mass, (3) passing the vapors produced in said heating zone to a cooling zone to condense aluminum bromide therefrom, (4) passing the uncondensed vapors from step 3 to a reaction zone wherein they are subjected to a temperature of from about 950° F. to about 1150° F. in the presence of metallic aluminum to form additional aluminum bromide, (5) passing the vapors from step 4 to a cooling zone to condense substantially pure aluminum bromide therefrom, and (6) recovering the aluminum bromide condensed in steps 3 and 5.

8. A process of recovering aluminum bromide from tarry masses formed in hydrocarbon conversion processes which employ aluminum bromide as a catalytic agent which comprises the steps of (1) admitting the tarry mass to a heating zone at a rate such that the volume of tar introduced thereto per minute is from about 1.33 to about 2.66 percent of the total volume of said zone while controlling the temperature of the zone within a range of from about 500° F. to about 625° F., (2) increasing the temperature within said zone after admission of the tarry mass thereto has been completed to cause an extensive cracking of said tarry mass to form a vaporous mixture containing free aluminum bromide, (3) passing the vapors from step 2 to a cooling zone to condense aluminum bromide therefrom, (4) passing the remaining vapors from step 3 to a reaction zone wherein they are contacted with metallic aluminum at an elevated temperature to form additional aluminum bromide, (5) passing the reformed vapors from step 4 to a cooling zone to condense substantially pure aluminum bromide therefrom, and (6) recovering the aluminum bromide condensed in steps 3 and 5.

9. A process of recovering aluminum bromide from tarry masses formed in hydrocarbon conversion processes which employ aluminum bromide as a catalytic agent which comprises the steps of (1) introducing the tarry mass into a heating zone at a substantially constant rate, while maintaining the temperature of said zone at a sufficiently high level to cause a rapid evolution of gases from said tarry mass without substantial cracking of the mass, (2) increasing the intensity of heating in said zone, after the introduction of the tarry mass thereto has been completed, so as to cause cracking of the aluminum bromide-hydrocarbon complexes present in said mass, (3) passing the vapors produced in said heating zone to a cooling zone to condense a mixture of aluminum bromide and hydrocarbons therefrom, (4) recycling the condensed mixture from step 3 to said heating zone until substantially all of the hydrocarbons and aluminum bromide-hydrocarbon complexes originally present in the tar have broken down to form free aluminum bromide, light fixed gases and coke, (5) continuing to cool the vapors from said heating zone after the recycle has been stopped to condense substantially pure aluminum bromide therefrom, and (6) recovering the aluminum bromide.

10. A process of recovering aluminum bromide from tarry masses formed in hydrocarbon conversion processes which employ aluminum bromide as a catalytic agent which comprises the steps of (1) introducing the tarry mass into a heating zone at a substantially constant rate, while maintaining the temperature of said zone at a sufficiently high level to cause a rapid evolution of gases from said tarry mass without substantial cracking of the mass, (2) increasing the intensity of heating in said zone, after the introduction of the tarry mass thereto has been completed, so as to cause cracking of the aluminum bromide-hydrocarbon complexes present in said mass, (3) passing the vapors produced in said heating zone to a cooling zone to condense a mixture of aluminum bromide and hydrocarbons therefrom, (4) recycling the condensed mixture from step 3 to said heating zone until substantially all of the hydrocarbons and aluminum bromide hydrocarbon complexes originally present in the tar have been broken down to form free aluminum bromide, light fixed gases and coke, (5) continuing to cool the vapors from said heating zone after the recycle has been stopped to condense substantially pure aluminum bromide therefrom, (6) passing the vapors from steps 3 and 5 to a reaction zone wherein they are contacted with metallic aluminum at an elevated temperature to form additional aluminum bromide, (7) cooling the vapors from step 6 to condense substantially pure aluminum bromide therefrom, and (8) recovering the aluminum bromide condensed in steps 5 and 7.

11. A process for the recovery of aluminum bromide from tarry masses containing complexes of aluminum bromide with hydrocarbons which complexes are formed in low temperature hydrocarbon conversion processes using aluminum bromide as the catalyst agent, comprising the steps of: (1) admitting the tarry mass to a heating zone at a rate of from about 100 to about 200 pounds per hour per cubic foot of free volume in said zone while controlling the temperature of the zone within a range of from about 500° F. to about 625° F., (2) increasing the temperature within said zone after admission of the tarry mass thereto has been completed to crack the aluminum bromide-hydrocarbon complexes present in said mass, (3) passing the vapors produced in said heating zone to a cooling zone to condense a mixture of aluminum bromide and hydrocarbons therefrom, (4) recycling the condensed mixture from step 3 to said heating zone until substantially all of the hydrocarbons and aluminum bromide-hydrocarbon complexes originally present in the tar have been broken down to form free aluminum bromide, light fixed gases and coke, (5) continuing to cool the vapors from said heating zone after the recycle has been stopped to condense substantially pure aluminum bromide therefrom, (6) passing the remaining vapors from steps 3 and 5 to a reaction zone wherein they are contacted with metallic aluminum at an elevated temperature to form additional aluminum bromide, (7) cooling the vapors from step 6 to condense substantially pure aluminum bromide therefrom, and (8) recovering the aluminum bromide condensed in steps 5 and 7.

12. A process for the recovery of aluminum bromide from tarry masses containing complexes of aluminum bromide with hydrocarbons which complexes are formed in low temperature hydrocarbon conversion processes using aluminum bromide as the catalyst agent, comprising the steps of: (1) admitting the tarry mass to a heating zone at a rate of from about 100 to about 200 pounds per hour per cubic foot of free volume in said zone while controlling the temperature of the zone within a range of from about 500° F. to about 625° F., (2) increasing the temperature within said zone after admission of the tarry mass thereto has been completed to crack the aluminum bromide-hydrocarbon complexes present in said mass, (3) passing the vapors produced in said heating zone to a cooling zone to condense a mixture of aluminum bromide and hydrocarbons therefrom, (4) recycling the condensed mixture from step 3 to said heating zone until substantially all of the hydrocarbons and aluminum bromide-hydrocarbon complexes originally present in the tar have been broken down to form free aluminum bromide, light fixed gases and coke, (5) continuing to cool the vapors from said heating zone after the recycle has been stopped to condense substantially pure aluminum bromide therefrom, (6) passing the vapors remaining from steps 3 and 5 to a reaction zone wherein they are contacted with metallic aluminum at a temperature of from about 950° F. to about 1150° F. to form additional aluminum bromide, (7) cooling the vapors from step 6 to condense substantially pure aluminum bromide therefrom, and (8) recovering the aluminum bromide condensed in steps 5 and 7.

13. A process for the recovery of aluminum bromide from tarry masses containing complexes of aluminum bromide with hydrocarbons which complexes are formed in low temperature hydrocarbon conversion processes using aluminum bromide as the catalyst agent, comprising the steps of: (1) admitting the tarry mass to a heating zone at a rate of from about 100 to about 200 pounds per hour per cubic foot of free volume in said zone while controlling the temperature of the zone within a range of from about 500° F. to about 625° F., (2) increasing the temperature within said zone to from about 650° F. to about 1600° F., after admission of the tarry mass thereto has been completed, to substantially completely crack the aluminum bromide-hydrocarbon complexes present in said mass, (3) passing the vapors produced in said heating zone to a cooling zone to condense a mixture of aluminum bromide and hydrocarbons therefrom, (4) recycling the condensed mixture from said cooling zone to said heating zone until aluminum bromide condensing in said cooling zone is substantially free of concomitantly condensed hydrocarbons, (5) continuing to cool the vapors from said heating zone after the recycle has been stopped to condense substantially pure aluminum bromide therefrom, and (6) recovering the aluminum bromide.

14. A process of recovering aluminum bromide from tars formed in hydrocarbon conversion processes which employ aluminum bromide as a catalytic agent which comprises the steps of (1) admitting the tar to a heating zone at a rate such that the volume of tar introduced thereto per minute is from about 1.33 to about 2.66 percent of the total volume of said zone while controlling the temperature of the zone within a range of from about 500° F. to about 625° F., (2) increasing the temperature within said zone to from about 650° F. to about 1600° F., after admission of the tar thereto has been completed, to substantially completely crack said tar, (3) passing the vapors produced in said heating zone to a cooling zone to condense a mixture of aluminum bromide and hydrocarbons therefrom, (4) recycling the condensed mixture from said cooling zone to said heating zone until aluminum bromide condensing in said cooling zone is substantially free of concomitantly condensed hydrocarbons, (5) continuing to cool the vapors from said heating zone after the recycle has been stopped to condense substantially pure aluminum bromide therefrom, (6) passing the uncondensed vapors from steps 3 and 5 to a reaction zone wherein they are contacted with metallic aluminum at a temperature of from about 950° F. to about 1150° F. to form additional aluminum bromide, (7) cooling the vapors from step 6 to condense substantially pure aluminum bromide therefrom, and (8) recovering the aluminum bromide condensed in steps 5 and 7.

THOMAS W. BAKER.
JULIAN FRIEDMAN.